3,157,592
SELECTIVE SEPARATION OF AROMATICS
FROM PARAFFINS
Ernst Fuerst, Neustadt an der Weinstrasse, Germany, assignor to Badische Anilin- & Soda-Fabrik Aktiengesellschaft, Ludwigshafen (Rhine), Germany
No Drawing. Filed Apr. 24, 1962, Ser. No. 189,685
Claims priority, application Germany, Apr. 27, 1961,
B 62,293
2 Claims. (Cl. 208—324)

This invention relates to a process for the selective separation of hydrocarbon mixtures. More specifically, the invention relates to a process for the selective separation of hydrocarbon mixtures, using N-hydroxyalkylpyrrolidones as selective solvents.

It is known to separate hydrocarbon mixtures consisting of paraffinic and aromatic components by means of solvents into raffinates rich in paraffins and extracts rich in aromatics. γ-Butyrolactone and N-alkylpyrrolidones, for example, have been proposed as suitable solvents.

I have found that particularly advantageous selective separation of aromatics and paraffins can be accomplished by the use of N-hydroxyalkylpyrrolidones, especially N-hydroxyethylpyrrolidone.

The selectivity of the N-hydroxyalkylpyrrolidones can be further improved by the addition of water. In general, it has proved advantageous to add from 5 to 25% of water to the N-hydroxyalkylpyrrolidones. Thus, for example, aromatic extracts which are practically free from paraffinic hydrocarbons can be obtained by means of a mixture containing 92% of N-hydroxyethylpyrrolidone and 8% of water.

Hydroxyalkylpyrrolidones whose alkyl groups contain from one to eight, and especially from one to six, carbon atoms are superior in selectivity to N-alkylpyrrolidones.

Examples of initial materials which may be separated by means of the hydroxyalkylpyrrolidones to be used according to this invention are hydrocarbon mixtures such as gasolines, for example reformed gasolines, hydrofining raffinates or acid raffinates of gasolines, especially of cracked gasolines or pyrolysis gasolines, as well as of benzoles. Extraction with hydroxyalkylpyrrolidones may be carried out in conventional manner, for example in continuous or batch equipment, advantageously with the use of vibration. As a rule, the separation of paraffins from aromatics is conducted at normal temperature, but elevated temperatures, for example from 30° to 60° C. or more, or lower temperatures, for example from 5° to 30° C., may also be used. The separation efficiency can be increased by means of a second paraffinic solvent.

The invention will be further illustrated by, but is not limited to, the following examples.

Example 1

A column 3.70 m. in height and 4 cm. in width with ring packing is used for the extraction. The selective solvent is introduced into the upper end of the column, and the hydrocarbon mixture to be separated into the central part of the column. The raffinate is drawn off continuously at the upper end of the column above the solvent inlet, while the extract is removed at the bottom of the column.

At the beginning of the extraction, 2700 cc. of solvent is introduced into the column. Then 353.5 cc. per hour of solvent and 214 cc. per hour of a mixture of equal parts by volume of benzene and heptane are fed to the column. The raffiniate and extract are freed from the solvent, and the aromatics content of both layers is determined by gas chromatography.

The extraction is carried out at 24° C. with equal amounts of N-hydroethylpyrrolidone, N-hydropropylpyrrolidone, N-hydroxyisopropylpyrrolidone and N-methylpyrrolidone, respectively. The results obtained are given in the following table:

| Selective solvent | Aromatics content of raffinate (weight percent) | Aromatics content of extract (weight percent) |
|---|---|---|
| N-hydroxyethylpyrrolidone: | | |
| +8% of water | 13.2 | 93.0 |
| +20% of water | 37.2 | 98.4 |
| N-hydroxypropylpyrrolidone: | | |
| +8% of water | 12.1 | 93.8 |
| +20% of water | 39.0 | 98.5 |
| N-hydroxyisopropylpyrrolidone: | | |
| +8% of water | 11.9 | 92.4 |
| +20% of water | 38.1 | 97.6 |
| N-methylpyrrolidone: | | |
| +8% of water | 3.2 | 69.0 |
| +20% of water | 15.0 | 91.4 |

Example 2

388 g. (500 cc.) of a hydrocarbon mixture consisting of equal volumes of benzene and heptane is mixed at 24° C. in a shaking apparatus with an equal colume (500 cc.) of N-methylpyrrolidone and N-hydroxyethylpyrrolidone, respectively. The layers which form are separated, each layer is freed from the solvent, and the weight determined:

| | Raffinate | | Extract | |
|---|---|---|---|---|
| | Weight (g.) | Aromatics (percent) | Weight (g.) | Aromatics (percent) |
| N-hydroxyethylpyrrolidone: | | | | |
| +8% of water | 305 | 43.1 | 78 | 93.6 |
| +20% of water | 351 | 51.9 | 33 | 99.3 |
| N-methylpyrrolidone: | | | | |
| +8% of water | 182 | 32.8 | 204 | 77.9 |
| +20% of water | 300 | 46.0 | 84 | 93.8 |

I claim:
1. A process for treating a hydrocarbon mixture to selectively separate the aromatic and paraffinic components thereof which comprises mixing a mixture of aromatics and paraffinic hydrocarbons with a selective solvent from the group consisting of N-hydroxyethyl pyrrolidone, N-hydroxy-n-propyl pyrrolidone and N-hydroxyisopropyl pyrrolidone and 5–25% water, based on said selective solvent, allowing the resultant mixture to separate into two phases to obtain a raffinate and an extract, the latter being rich in the aromatic hydrocarbon component of said hydrocarbon mixture.

2. A process as claimed in claim 1 wherein said mixing and said separating steps are conducted in a column into which said solvent is introduced continuously at the upper end of said column, said hydrocarbon mixture is introduced continuously into the mid-portion of said column, said raffinate is withdrawn continuously from the upper end of said column above the point of introduction of said solvent, and said extract is withdrawn from the bottom of said column.

References Cited in the file of this patent
UNITED STATES PATENTS

| 2,868,801 | Steele | Jan. 13, 1959 |
| 2,933,448 | Morin et al. | Apr. 19, 1960 |
| 2,943,122 | Templeman et al. | June 28, 1960 |
| 3,072,568 | Norton | Jan. 8, 1963 |

UNITED STATES PATENT OFFICE
CERTIFICATE OF CORRECTION

Patent No. 3,157,592                                November 17, 1964

Ernst Fuerst

It is hereby certified that error appears in the above numbered patent requiring correction and that the said Letters Patent should read as corrected below.

Column 1, line 67, for "raffiniate" read -- raffinate --; column 2, lines 2 and 3, for "N-hydroethylpyrrolidone, N-hydropropylpyrrolidone" read -- N-hydroxyethylpyrrolidone, N-hydroxypropylpyrrolidone --; line 25, for "colume" read -- volume --; same column 2, Example 2, in the table, fifth column, line 2 thereof, for "99.3" read -- 97.3 --.

Signed and sealed this 11th day of May 1965.

(SEAL)
Attest:

ERNEST W. SWIDER                              EDWARD J. BRENNER
Attesting Officer                                    Commissioner of Patents